US008844818B2

United States Patent
Liu et al.

(10) Patent No.: US 8,844,818 B2
(45) Date of Patent: Sep. 30, 2014

(54) MAGNETIC STRIPE READER

(71) Applicant: Verifone, Inc., San Jose, CA (US)

(72) Inventors: John Liu, Junghe (TW); Kyle Chang, Taipei (TW); TeeHuang Chou, New Taipei (TW)

(73) Assignee: Verifone, Inc., San Jose, CA (US)

( * ) Notice: Subject to any disclaimer, the term of this patent is extended or adjusted under 35 U.S.C. 154(b) by 0 days.

(21) Appl. No.: 13/849,867

(22) Filed: Mar. 25, 2013

(65) Prior Publication Data

US 2013/0256414 A1    Oct. 3, 2013

Related U.S. Application Data

(60) Provisional application No. 61/618,890, filed on Apr. 2, 2012.

(51) Int. Cl.
    *G06K 7/08* (2006.01)
    *G06F 1/32* (2006.01)

(52) U.S. Cl.
    CPC .............. *G06K 7/082* (2013.01); *G06F 1/3287* (2013.01); *G06F 1/3234* (2013.01); *G06F 1/3206* (2013.01)
    USPC ....................................................... 235/449

(58) Field of Classification Search
    CPC ......................................... G06K 7/084–7/087
    USPC ....................................................... 235/449
    See application file for complete search history.

(56) References Cited

U.S. PATENT DOCUMENTS

| | | | | |
|---|---|---|---|---|
| 5,963,900 A | * | 10/1999 | Yamauchi | 704/230 |
| 7,163,148 B2 | * | 1/2007 | Durbin et al. | 235/449 |
| 7,430,674 B2 | | 9/2008 | Mueller | |
| 7,472,829 B2 | | 1/2009 | Brown | |
| 8,231,055 B2 | | 7/2012 | Wen | |
| 8,235,287 B2 | | 8/2012 | McKelvey | |
| 8,302,860 B2 | | 11/2012 | McKelvey | |
| 8,534,555 B1 | * | 9/2013 | Sweet et al. | 235/449 |
| 2006/0249574 A1 | | 11/2006 | Brown | |
| 2012/0037709 A1 | | 2/2012 | Cloutier | |
| 2012/0091201 A1 | | 4/2012 | Babu | |

FOREIGN PATENT DOCUMENTS

WO    2012/051067 A1    4/2012

OTHER PUBLICATIONS

U.S. Appl. No. 61/618,890, filed Apr. 2, 2012.

* cited by examiner

*Primary Examiner* — Christle I Marshall
(74) *Attorney, Agent, or Firm* — Sughrue Mion, PLLC

(57) ABSTRACT

A magnetic stripe reader including a magnetic reader head providing at least one data output, an F2F decoder receiving the at least one data output and providing a decoded data output, a microprocessor receiving and processing the decoded data output and power saving circuitry operative to control the operation of the F2F decoder and the microprocessor thereby to maintain the F2F decoder and the microprocessor in a power-saving sleep mode other than during magnetic stripe reading by the magnetic reader head and a selected time duration thereafter.

17 Claims, 1 Drawing Sheet

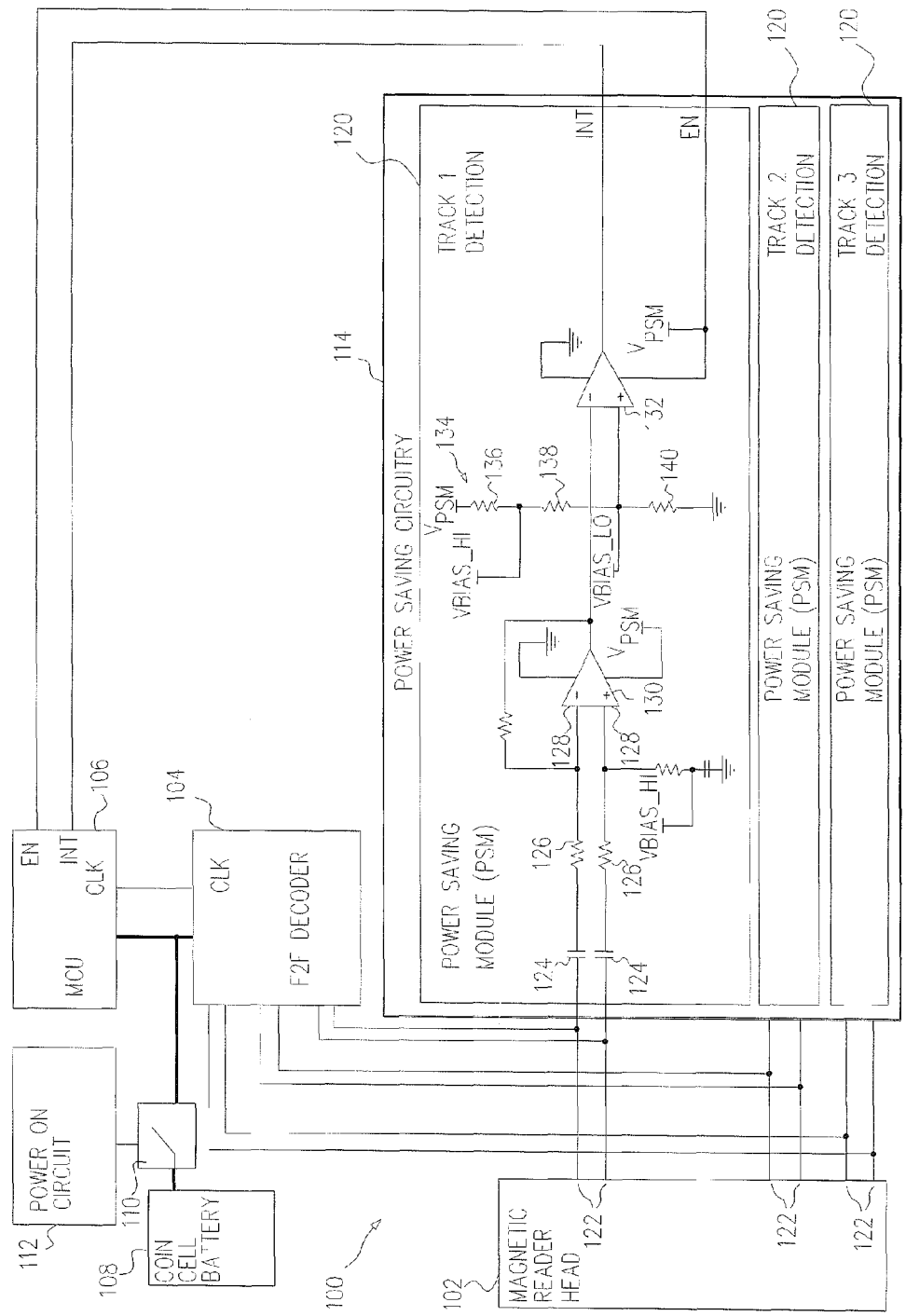

MAGNETIC STRIPE READER

REFERENCE TO RELATED APPLICATION

Reference is hereby made to U.S. Provisional Patent Application Ser. 61/618,890, filed Apr. 2, 2012 and entitled ADVANCE POWER SAVING FOR MAGNETIC STRIPE READER (MSR), the disclosure of which is hereby incorporated by reference and priority of which is hereby claimed pursuant to 37 CFR 1.78(a)(4) and (5)(i):

FIELD OF THE INVENTION

The present invention relates to magnetic stripe readers generally.

BACKGROUND OF THE INVENTION

Various types of magnetic stripe reader devices are known in the art.

SUMMARY OF THE INVENTION

The present invention seeks to provide an improved magnetic stripe reader.

There is thus provided in accordance with a preferred embodiment of the present invention a magnetic stripe reader including a magnetic reader head providing at least one data output, an F2F decoder receiving the at least one data output and providing a decoded data output, a microprocessor receiving and processing the decoded data output and power saving circuitry operative to control the operation of the F2F decoder and the microprocessor thereby to maintain the F2F decoder and the microprocessor in a power-saving sleep mode other than during magnetic stripe reading by the magnetic reader head and a selected time duration thereafter.

Preferably, the power saving circuitry receives an output from the magnetic reader head and is responsive to the output for awakening at least the F2F decoder from the power-saving sleep mode. Alternatively or additionally, the power saving circuitry receives an output from the magnetic reader head and is responsive to the output for awakening the microprocessor from the power-saving sleep mode.

In accordance with a preferred embodiment of the present invention the magnetic stripe reader also includes a battery supplying power to at least one of the F2F decoder and the microprocessor. Additionally or alternatively, the magnetic stripe reader also includes a circuit controlling flow of the power to the at least one of the F2F decoder and the microprocessor.

Preferably, the magnetic stripe reader also includes power saving circuitry connected to at least one of the magnetic reader head, the microprocessor and the F2F decoder. Additionally, the power saving circuitry is operative to awaken the processor and the F2F decoder from the power-saving sleep mode in response to receipt of card swipe activity by the magnetic reader head.

In accordance with a preferred embodiment of the present invention the at least one power saving module is connected to at least one contact pair of the magnetic reader head. Additionally or alternatively, the power saving circuitry includes at least one power saving module.

Preferably, the at least one power saving module includes a capacitor, a resistor and a micro power amplifier, the capacitor being connected, in series with the resistor, to an input of the micro power amplifier.

In accordance with a preferred embodiment of the present invention the at least one power saving module also includes a comparator, and the comparator includes a first input supplied from an output of the micro power amplifier, a second input coupled to a voltage divider and a third input, receiving an input EN signal from an EN output of the microprocessor. Additionally, an output of the comparator is supplied to an INT input of the microprocessor. Alternatively or additionally, the voltage divider includes three series connected resistors.

Preferably, the microprocessor is operative to supply power to the power saving circuitry when the F2F decoder enters the power-saving sleep mode. Additionally or alternatively, the microprocessor is operative to terminate supplying power to the power saving circuitry when the F2F decoder wakes up from the power-saving sleep mode.

In accordance with a preferred embodiment of the present invention the microprocessor enters the power-saving sleep mode upon being initialized. Additionally or alternatively, the F2F decoder enters the power-saving sleep mode upon being initialized.

BRIEF DESCRIPTION OF THE DRAWINGS

The present invention will be understood and appreciated more fully from the following detailed description taken in conjunction with the drawing in which:

FIG. 1 is a simplified block diagram/schematic illustration of a magnetic stripe reader constructed and operative in accordance with a preferred embodiment of the present invention.

DETAILED DESCRIPTION OF A PREFERRED EMBODIMENT

Reference is now made to FIG. 1, which is a simplified block diagram/schematic illustration of a magnetic stripe reader constructed and operative in accordance with a preferred embodiment of the present invention.

As seen in FIG. 1, there is provided a magnetic stripe reader 100, which includes a magnetic reader head 102, typically a three-stripe reader head, commercially available from MTI Electronics Corporation, 1-3 East 4th Street, Kaohsiung Export Processing Zone, Kaohsiung, Taiwan ROC.

Outputs of the magnetic reader head 102 are typically provided to an F2F decoder 104, such as an IC-MSR MRD532, manufactured by Uniform Industrial Corp of 1F, No 1, Ln 15, Ziqiang Tucheng Dist, New Taipei City 226, Taiwan R.O.C. The F2F decoder 104 typically includes a data input from magnetic reader head 102 and is operative to enter a sleep mode when no data signal from a magnetic stripe card is being received by the magnetic reader head 102 and thus the state of the data input remains low for at least a predetermined duration of time.

An output of the F2F decoder 104 is preferably supplied to a microprocessor 106, such as an IC-MPU STM32L151C6T6 manufactured by STMicroelectronics of 39, Chemin du Champ des Filles Plan-Les-Ouates, Geneva, Switzerland. The microprocessor 106 typically includes an INT input which is operative to awaken the microprocessor 106 from a sleep mode upon receipt of an INT signal.

Both the microprocessor 106 and the F2F decoder 104 typically receive electrical power from a battery 108, such as a coin cell battery, via a switch 110. Switch 110 is typically operated by a power-on circuit 112, such as a transistor MMBT3904WT1G manufactured by ON Semiconductor of 5005 East McDowell Road, Phoenix, Ariz. 85008 USA.

It is a particular feature of the present invention that power saving circuitry 114 is provided and connected to the magnetic reader head 102, the microprocessor 106 and the F2F decoder 104 for monitoring card swipe activity by the magnetic reader head 102 and for awakening both the microprocessor 106 and the F2F decoder 104 from a power saving sleep mode in response to monitored card swipe activity. Microprocessor 106 enters the sleep mode when no INT signal is being received from power saving circuitry 114.

Preferably, power saving circuitry 114 comprises up to three identical power saving modules 120, each coupled to a different track reading contact pair 122 of the magnetic reader head 102. Alternatively, only one or two power saving modules 120 may be provided and connected to only one or two contact pairs 122 of the magnetic reader head 102. As a further alternative multiple contact pairs 122 may be coupled to a single suitably configured power saving module. Each pair of contacts 122 provides output signals from reading a single stripe of a magnetically encoded card or other medium as an input to a power saving module 120.

The structure and operation of each of the power saving modules 120 is now described: Each contact of each pair of contacts 122 of the magnetic reader head 102 is preferably coupled via a capacitor 124, connected in series with a resistor 126, to an input 128 of a micro power amplifier 130, such as an S-89110BFM-H4A-TFU IC-OPAMP, manufactured by Seiko Instrument of 8, Nakase 1-chome, Mihama-Ku, Chiba-Shi, Chiba, Japan.

The output of micro power amplifier 130 is supplied to an input of a comparator 132, a second input of which is coupled to a voltage divider 134, which includes three series connected resistors 136, 138 and 140. Comparator 132 also receives an input EN signal from an EN output of the microprocessor 106. An output of comparator 132 is supplied to the INT input of microprocessor 106.

The EN signal is generated by microcontroller 106 as follows. When the F2F decoder 104 enters sleep mode, the EN signal goes high to supply power to power saving circuitry 114. When power saving circuitry 114 detects any signal from magnetic stripe card, the INT signal output of comparator 132 wakes up the microprocessor 106 and the microcontroller 106 then resets the EN signal to low, which results in an immediate termination of supply of electrical power to the power saving circuitry 114, thereby to further save power.

Preferably, when a magnetic stripe card is read by the magnetic reader head 102, one or more initial zeros are detected. The detection of the initial zeros is operative to cause the power saving circuitry 114 to provide a high output to the INT input of the microprocessor 106, thereby to cause the microprocessor 106 to wake up from the sleep mode and to cause the F2F decoder 104 to also wake up from the sleep mode.

A typical operating procedure is summarized hereinbelow.

When switch 110 is closed, electrical power is supplied to the various circuit components of the magnetic stripe reader 100 and the F2F decoder 104 and the power saving circuitry 114 are initialized. Typically, the F2F decoder 104 enters a power saving sleep mode of operation as does the microprocessor 106.

Immediately upon the beginning of a card swipe by the magnetic stripe reader 102, detection of at least one leading zero on at least one magnetic stripe causes the power saving circuitry 114 to provide a card swipe beginning (CSB) output to the INT input of the microprocessor 106, thereby awakening the microprocessor 106 from its sleep mode by changing the INT state of the microprocessor. Microprocessor 106 then sets a clock signal CLK of F2F decoder 104 to high and thus awakens the F2F decoder 104 from its sleep mode.

The data read by the magnetic stripe reader 102 is then decoded by F2F decoder 104 and further processed by microprocessor 106. In the absence of reading additional data by the magnetic stripe reader 102 for at least a predetermined time duration, typically 1-60 seconds, both the microprocessor 106 and the F2F decoder 104 re-enter the power saving sleep mode by setting EN signal to high.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. A magnetic stripe reader comprising:
   a magnetic reader head providing at least one data output;
   an F2F decoder receiving said at least one data output and providing a decoded data output;
   a microprocessor receiving and processing said decoded data output; and
   power saving circuitry operative to control the operation of said F2F decoder and said microprocessor thereby to maintain said F2F decoder and said microprocessor in a power-saving sleep mode other than during magnetic stripe reading by said magnetic reader head and a selected time duration thereafter.

2. A magnetic stripe reader according to claim 1 and wherein said power saving circuitry receives an output from said magnetic reader head and is responsive to said output for awakening at least said F2F decoder from said power-saving sleep mode.

3. A magnetic stripe reader according to claim 1 and wherein said power saving circuitry receives an output from said magnetic reader head and is responsive to said output for awakening said microprocessor from said power-saving sleep mode.

4. A magnetic stripe reader according to claim 1 and also comprising a battery supplying power to at least one of said F2F decoder and said microprocessor.

5. A magnetic stripe reader according to claim 1 and also comprising a circuit controlling flow of said power to said at least one of said F2F decoder and said microprocessor.

6. A magnetic stripe reader according to claim 1 and also comprising power saving circuitry connected to at least one of said magnetic reader head, said microprocessor and said F2F decoder.

7. A magnetic stripe reader according to claim 6 and wherein said power saving circuitry is operative to awaken said microprocessor and said F2F decoder from said power-saving sleep mode in response to receipt of card swipe activity by said magnetic reader head.

8. A magnetic stripe reader according to claim 6 and wherein said at least one power saving module is connected to at least one contact pair of said magnetic reader head.

9. A magnetic stripe reader according to claim 6 and wherein said power saving circuitry comprises at least one power saving module.

10. A magnetic stripe reader according to claim 9 and wherein said at least one power saving module comprises:
   a capacitor;
   a resistor; and
   a micro power amplifier, said capacitor being connected, in series with said resistor, to an input of said micro power amplifier.

11. A magnetic stripe reader according to claim 10 and wherein said at least one power saving module also comprises a comparator, wherein said comparator comprises:
   a first input supplied from an output of said micro power amplifier;
   a second input coupled to a voltage divider; and
   a third input, receiving an input EN signal from an EN output of said microprocessor.

12. A magnetic stripe reader according to claim 11 and wherein an output of said comparator is supplied to an INT input of said microprocessor.

13. A magnetic stripe reader according to claim 11 and wherein said voltage divider comprises three series connected resistors.

14. A magnetic stripe reader according to claim 1 and wherein said microprocessor is operative to supply power to said power saving circuitry when said F2F decoder enters said power-saving sleep mode.

15. A magnetic stripe reader according to claim 1 and wherein said microprocessor is operative to terminate supplying power to said power saving circuitry when said F2F decoder wakes up from said power-saving sleep mode.

16. A magnetic stripe reader according to claim 1 and wherein said microprocessor enters said power-saving sleep mode upon being initialized.

17. A magnetic stripe reader according to claim 1 and wherein said F2F decoder enters said power-saving sleep mode upon being initialized.

* * * * *